United States Patent
Yang et al.

(10) Patent No.: US 8,559,720 B2
(45) Date of Patent: Oct. 15, 2013

(54) USING A VIDEO PROCESSING AND TEXT EXTRACTION METHOD TO IDENTIFY VIDEO SEGMENTS OF INTEREST

(75) Inventors: Ruiduo Yang, San Diego, CA (US); Ying Luo, Stevenson Ranch, CA (US); Claire-Hélène Demarty, Montreuil le Gast (FR); Lionel Oisel, La Nouaye (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 977 days.

(21) Appl. No.: 12/383,868

(22) Filed: Mar. 30, 2009

(65) Prior Publication Data
US 2010/0246944 A1    Sep. 30, 2010

(51) Int. Cl.
*G06K 9/34* (2006.01)

(52) U.S. Cl.
USPC .............................. 382/176; 382/170; 382/281

(58) Field of Classification Search
USPC .......................... 382/162, 168, 170, 176, 281
See application file for complete search history.

(56) References Cited

U.S. PATENT DOCUMENTS

| | | | |
|---|---|---|---|
| 2003/0091235 A1* | 5/2003 | Xiong ............................ | 382/199 |
| 2003/0177503 A1* | 9/2003 | Sull et al. ...................... | 725/112 |
| 2004/0255249 A1 | 12/2004 | Chang et al. | |
| 2005/0203927 A1* | 9/2005 | Sull et al. ...................... | 707/100 |
| 2006/0064716 A1* | 3/2006 | Sull et al. ......................... | 725/37 |
| 2008/0138029 A1* | 6/2008 | Xu et al. .......................... | 386/46 |

* cited by examiner

*Primary Examiner* — Phuoc Tran
(74) *Attorney, Agent, or Firm* — Robert D. Shedd; Vincent E. Duffy; Joel M. Fogelson

(57) ABSTRACT

A video processing technique is performed on a video media service to identify video segments of interest. The video processing technique (200) is supplemented by a text extraction technique (245, 255, 270), as well. The resulting video segments of interest (289) can be stored as to produce a version of the media service which is shorter in time length than the original video media service.

7 Claims, 5 Drawing Sheets

USING A VIDEO PROCESSING AND TEXT EXTRACTION METHOD TO IDENTIFY VIDEO SEGMENTS OF INTEREST

FIELD OF THE INVENTION

The invention is related to the playback of a video based media service, specifically the Indexing of a video program by the use of metadata.

BACKGROUND OF THE INVENTION

In the broadcast of a television show, such as a sporting event, a user will have to commit to several hours of viewing time to see highlights that take place during the course of the same. Although a user can catch highlights of a game by also watching a news program afterwards, the user can desire to see more highlights than presented in the two or three minutes time typically reserved during the newscast. Additionally, there is a value in having a sporting event be shortened by a period of time, for a broadcaster, where the highlights of a video program can be presented, without having a person in a production room manually excise out the segments of the sporting event which are not of interest.

SUMMARY OF THE INVENTION

A method is disclosed for automatically indexing a video program, such as a media service, by using a visual analysis and a text extraction technique to develop metadata which is used to index the video program.

DETAILED DESCRIPTION OF THE INVENTION

For purposes of this application, the term media service can be audio services (e.g., music, radio based talk show, streaming audio) and/or video services (e.g., television shows, movies, computer/video games). Such media services can be received via a remote source (e.g., satellite, Internet, cable, broadcast antenna, public switched telephone network (PSTN), cellular network, infrared transmitter), as a service provider, transmits media services signals that are received by multimedia devices including, for example, digital satellite systems, modems, and antennas. These types of devices process the media services signals and can distribute such services to other devices or a device that such components are connected to. Multimedia devices such as digital satellite systems and modems can be bi-directional; so as to communicate with remote sources for requesting media services (for example, a video on demand programming from a cable service, an Internet source such as Netflix and the like, and a bidirectional multimedia service operator who delivers via a connection audio and video services), electronic program guide information, upgrading software drivers and codecs, and the like.

Examples of the content of media service files includes songs, political speeches, news broadcasts, movie trailers, movies, television shows, live broadcasts, radio broadcasts, financial conference calls, live concerts, web-cam footage, and other special events; although this list is not exhaustive.

This application also makes use of the term "media service device" which is a device that is capable of rendering a media service. Examples of media service devices include televisions, radios, set top boxes, computers, desktop computers, laptop computers, video game systems, telephones, portable media device, MP3 players, portable audio devices, portable video devices, and combination thereof, and the like, where such a definition is not limited to future or currently known devices.

Additionally, the principles of the present invention can be implemented in a professional video editing environment where equipment such as a video editing program as the EDIUS video editing program by GRASS VALLEY can be used for automatic editing of video segments of a media service, although the principles of the present invention can be implemented by other video editing programs or apparatuses, as well. Likewise, a video editing program used in a newsroom can be used to produce an edited version of a media service in accordance with the invention, where amount of video segments of the edited video service are fewer than the video service in its unedited format.

The terms pictures, frames, slices, and the like represent the same concept, where such image elements are part of a video sequence, where a video sequence is composed of pictures, frame, slices, and the like.

Figure 1:
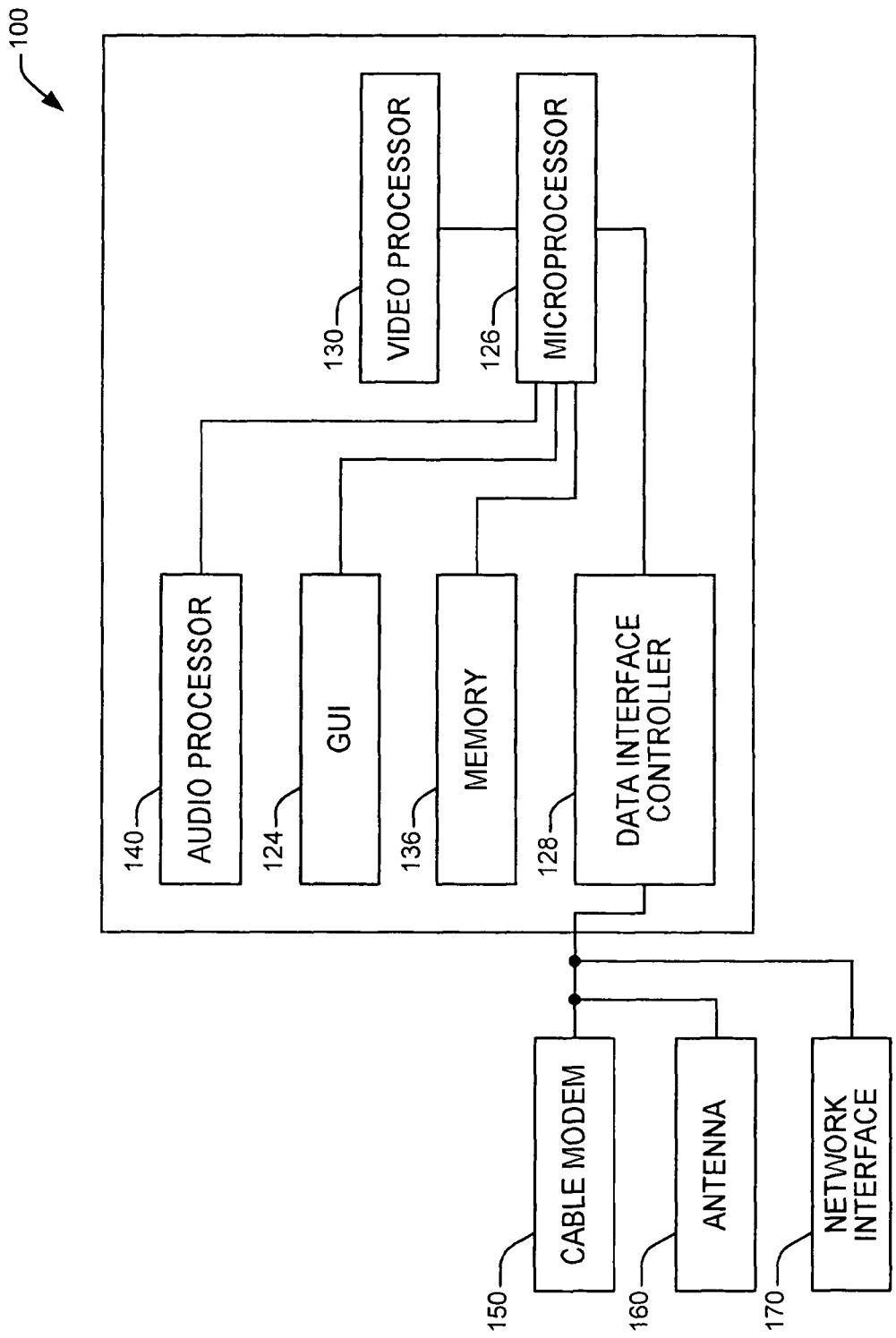
FIG. 1 is an exemplary diagram of an apparatus which can be used to implement the invention.

FIG. 1 shows an exemplary embodiment of a set top box 100, as an example of a device capable of receiving and editing a video media services. Video processor 130 and audio processor 140 are used by set top box 100 for rendering a media service. Video processor 130 also displays characters of selections made via a user control device, as a remote control, via an on screen display (OSD) function. Guided User Interface 124 (GUI) is a control system that allows the functions of set top box 100 (related to rendering a media service, sound/graphic options, and the like) to be controlled graphically, as through the use of a user operated indicator (as an arrow, cursor, or the like). Memory 136 stores programming modules, maintenance routines, extracted metadata from media services, search results, and other data necessary to operate set top box 100. Memory 136 can be a storage device such as a hard disk, a solid state memory device, a memory chip, a digital versatile disc, a BLU-RAY disc, and the like. Microprocessor 126 controls the operation of set top box 100, where microprocessor 126 is coupled to GUI 124, video processor 130, memory 136, and audio processor 140. Data interface/controller 128 couples microprocessor 126 to a communication interfaces as cable modem 150 (for receiving broadband media services), antenna 160 (for receiving broadcasted programming via terrestrial/satellite sources), or network interface 170 (such as an Ethernet card which is used receiving broadband media services through a communications network, for example, the Internet). Other components or modules can be used with set top box (STB) 100, in accordance with the principles of the invention. Likewise, microprocessor 126 can have programming code corresponding to a video editing program, where the results of the editing operation of the program are stored in memory 136.

One approach for producing an indexed video media service makes use of a the text that is transmitted as part of the video media service, such as closed captioning data, Such text can be used to locate important events in a video media service. For example, for a sporting event, the text searched for are the keywords that are associated with game statistics such as down, score, time of the game, players names, key scoring events, distances traveled, and the like. These keyword events can be predefined by assigning a relative score to certain keywords where a term "TOUCHDOWN" for an American Football Game would have a higher (and more important score) than the term "FOOTBALL" or "TIME OUT". Other video programs can have other keywords of interest, and in addition other text services can be used such as teletext, auxiliary text, program guide information, RSS feeds, interactive television information associated with the video media service, and the like.

From the identification of these keywords, a time index can be generated, where the keywords are mapped against a time index against the video media service where a predefined number of seconds before and after the time a keyword is presented would represents a video segment of interest. These times would then be stored, where such times would correspond to a potential video segment of interest Optionally, this approach can be enhanced by associating additional keywords together, as to further breakdown a video media service.

For example, for an American football game, the time index can have all of the respective downs (which represent discrete periods of the football game) mapped against a time index, where the video media service is broken down into discrete segments, where each segment starts and ends with the time associated with a particular down. The time segments associated with either commercials or time outs would then be excised from the media service automatically because the time index could be used only to retain the video segments of interest.

From the left over video segments, the invention then can assign a higher value to the time period for a down associated with the keyword "TOUCHDOWN" which is an event where points are scored, versus a down associated with the keywords "NO CHANGE IN YARDS", where a ball does not move. The invention then can rank the respective segments by using the respective groupings and scores of keywords.

The approach of keyword extraction though can benefit by further enhancement by processing the video of a video media service, itself, by using identification techniques as described below. Specifically, video processing techniques can be used to detect video shot boundaries from the video media service, detect special features in the video, such as placement of various objects in the video, and automatically align identified events with the text extraction techniques as described above. That is, text extraction techniques alone can not account for time segments which can have different time lengths such as the downs for a football game where one down can be longer or shorter than a second down.

Figure 2:
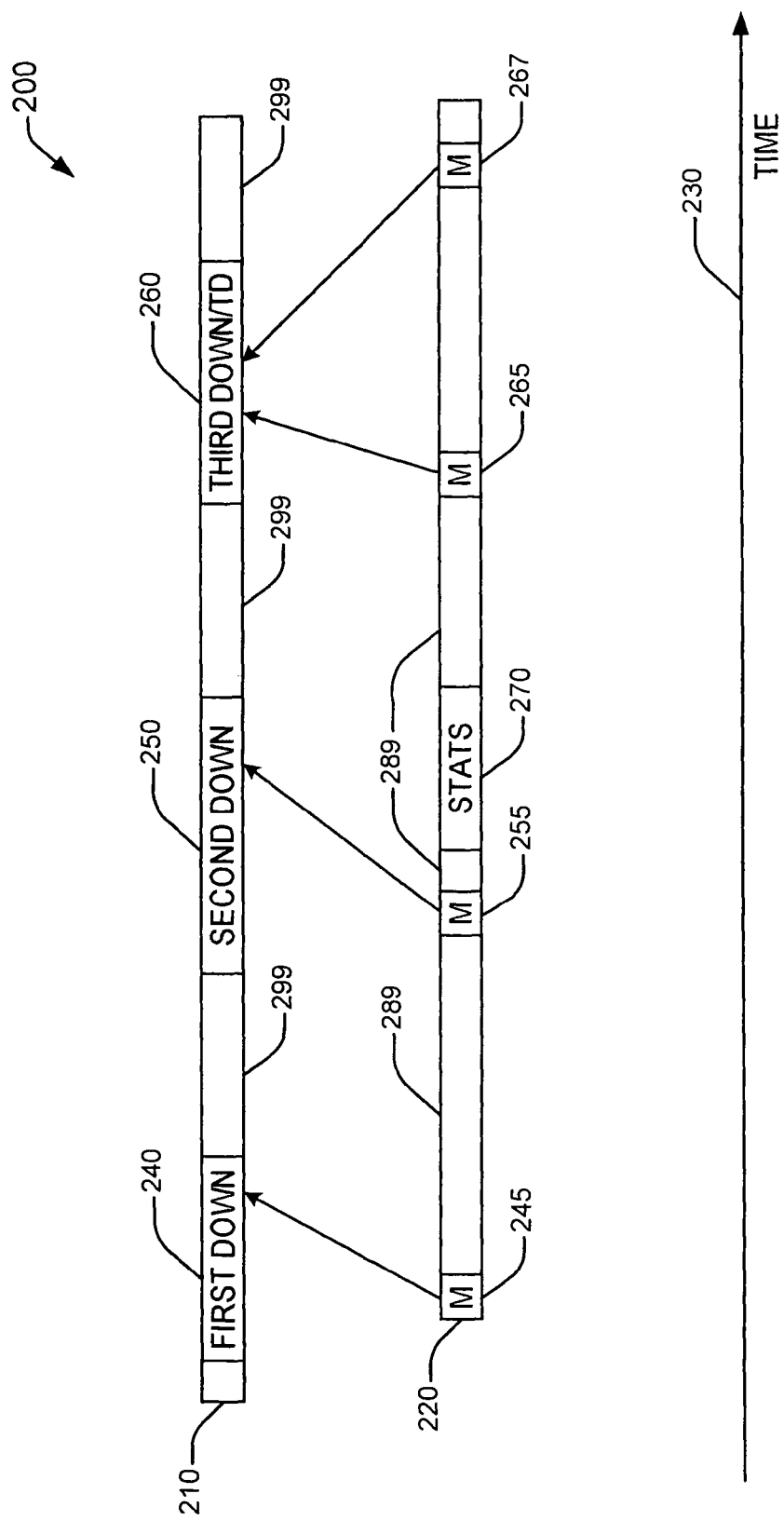
FIG. 2 is a diagram showing a relationship between a video media service, the segments of the video media service, and the corresponding metadata of the video media service, in accordance with the principles of the present invention.

FIG. 2 is diagram of a video media service which is segmented into different sections, as to help illustrate the principles of boundary shot detection which are used in tandem with keyword extraction. Specifically, diagram 200 is an example the structure of an American Football game which is broken down into different periods known as downs. Video timeline 210 represents the different downs within a video sequence, That is, 240 represents the video sequence comporting to a first down, 250 comports to the video sequence representing a second down, and 260 corresponds to the video sequence for a third down. Within the timing of the football game, a touchdown was also scored during the third down, so this event would be part of the video sequence 260, as well. Video timeline also has video sequences 299 which represent video sequences that are not of interest. These sequences are mapped against time line 230 which represents when such segments take place.

Without the use of video detection sequences, there would be no way to distinguish between video sequences of interest for indexing (240, 250, 260), and video sequences that are unimportant for indexing purposes (299). The present invention proposes that one utilize a video processing technique such as shot boundary detection to distinguish between video sequences of interest, and video sequences which represent. That is, the invention has to determine how to divide up a video media service, as represented by timeline 210, into distinct video sequences.

Figure 3A:
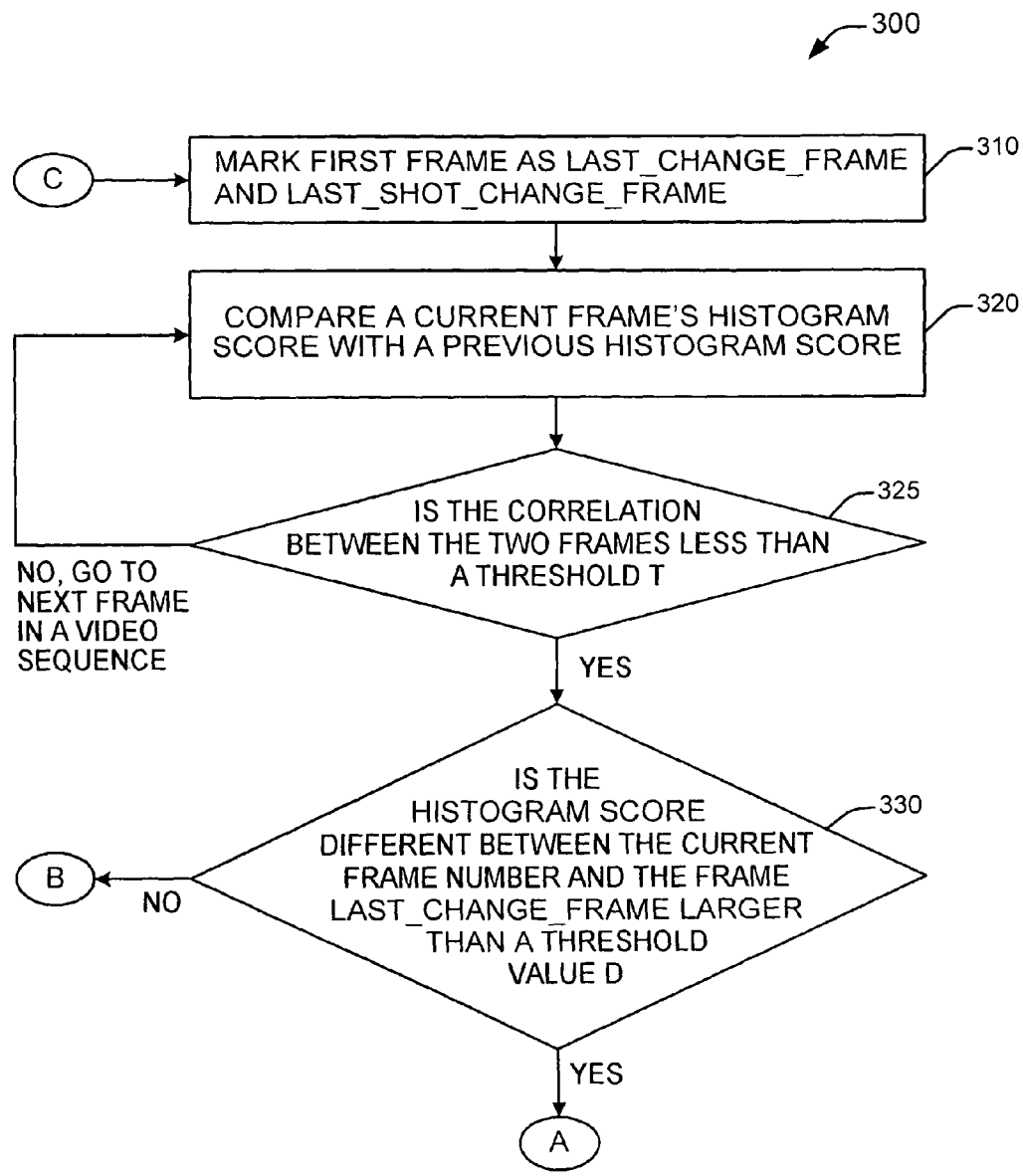
FIGS. 3A-B are flowcharts showing a video processing method that determines whether video segments of interest are either standing shots or transition shots, in accordance with the principles of the present invention.
Figure 3B:
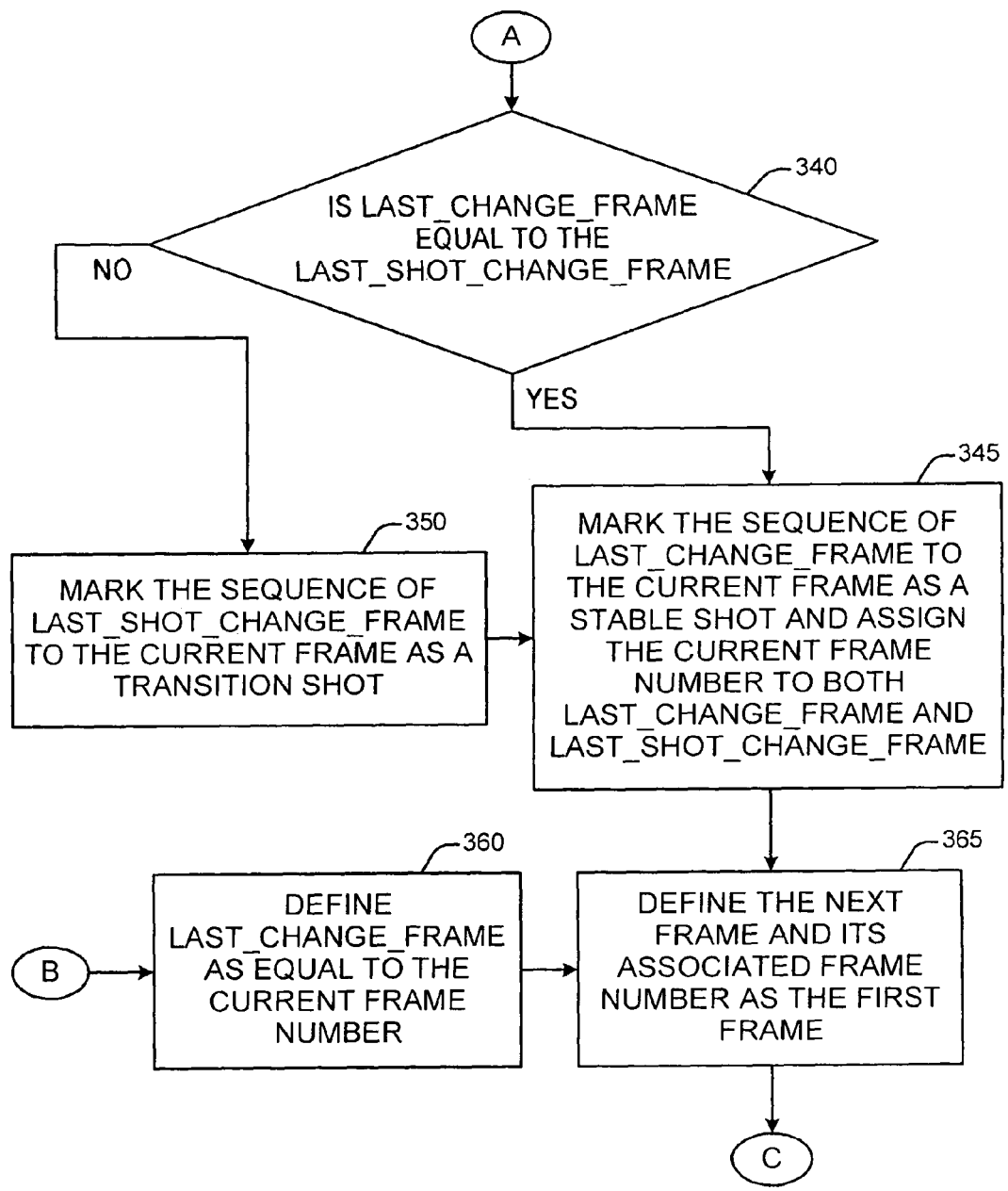

FIG. 3 discloses an exemplary shot boundary detection method in accordance with the principles of the present invention. The method, as described, is performed in accordance with a video processing method that calculates a histogram of the colors of various pictures in a video media service, where the histograms can be calculated for all of the frames of the sequence or a subset of pictures taken at different times or where the histogram is performed only for the "I" frames in the video sequence. The histograms can then be developed into a score for each frame. For example, the score would correlate to the bin values used for histogram corresponding to a particular frame. The histogram scores can then be compared in a manner, as shown in method 300.

For the operation of method 300, each frame in the video media service which has an associated histogram score will also have a frame number identified with the frame. These frame numbers are sequentially increased from frame to frame. For example, the first frame for a media service will have a frame number X, while the next frame in the sequence will have a frame number X+1, while the frame after that one will have a frame number X+2; X can represent any arbitrary number.

Additionally, a determination is made for a relevant sequence of frames, where a sequence of frames will be defined as either being a stable shot or a transition shot. A stable shot is a sequence of frames where the objects that are part of the video sequence remain mostly still. This would be associated with, in the current example of an American Football Game, the time a down is starting. Hence, a sequence known as a stable shot could be the beginning of a down. Otherwise, a sequence of frames will be known as a transition shot which is not the start of a down, where movement takes place during the video sequence or the video sequence is part of a commercial, and the like.

To begin, in step 310, two values are defined for both LAST_CHANGE_FRAME and LAST_SHOT_CHANGE_FRAME, where the values for both of these variables will be equal to the frame number of the first frame in a video media service. The next step 320, has a comparison performed between the histogram score for a current frame which is compared against the histogram score for the frame that comes before the current frame. Specifically, in step 325 a determination is made if the correlation between the current frame and the previous frame are less than a threshold T. If the two frame's have a correlation that is more than the threshold, step 320 will be repeated, where the histogram score of the current frame will become the histogram of the previous frame. Also, the next frame in the sequence will be known as the current frame.

If the correlation between the histogram scores for the current frame and previous frame are below a certain threshold, the method proceeds with step 330 where another comparison is performed. This time, a determination is made whether the histogram scores between the current frame and the video frame with a frame number corresponding to the LAST_CHANGE_FRAME is larger than a threshold number. That is, the correlation between the two histograms for each of the frames.

If the answer is no to the above calculation, then the method assigns the frame number of the current frame to the variable LAST_CHANGE_FRAME as in step 360. Otherwise, method step 340 has a determination made which determines whether the frame number of the LAST_CHANGE_FRAME number equal to the frame number associated with the LAST_ SHOT_CHANGE_FRAME. If the answer is no, in step 350, the sequence of frames with the numbers from the LAST_ SHOT_CHANGE_FRAME to the current frame are identified as being part of a "transition shot". This means that the video sequence can have a moving image as part of this sequence. Step 345 then follows step 350.

If the answer to step 340 is yes, then in step 345, the sequence of video frames corresponding from the frame number equal to the LAST_CHANGE_FRAME to the frame number equal to the current frame are identified as being a stable shot. A stable shot, ideally, is a video sequence which presents the same type of video image where objects in the image do not move that much. In addition, in step 345 the current frame number is assigned to both the LAST_CHANGE_FRAME variable and LAST_ SHOT_CHANGE_FRAME variable.

Both steps 360 and 345 conclude with method step 365 which defines the next frame in a sequence of frames as the "first frame" as to restart method 300 with step 310.

Figure 4:
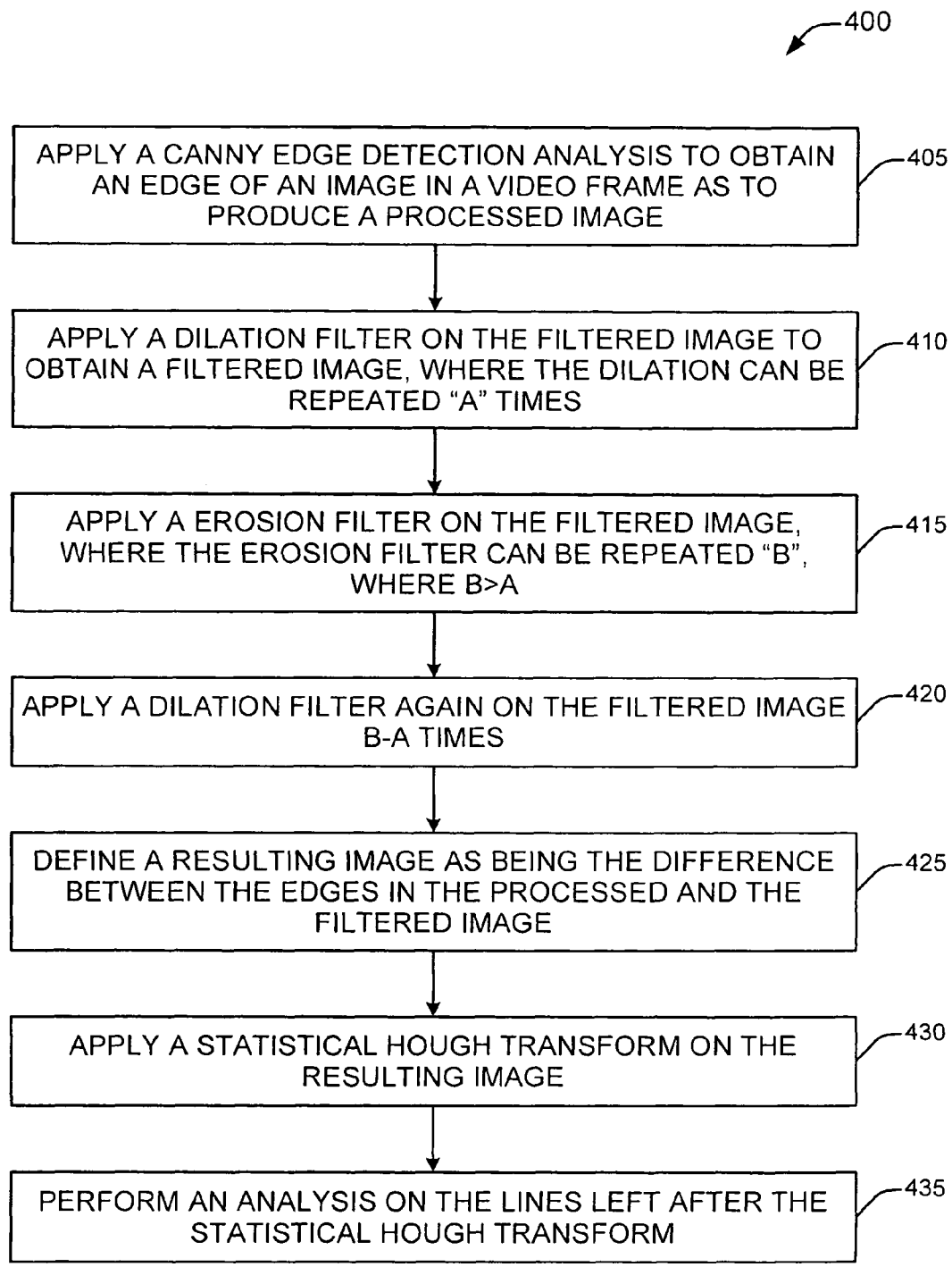
FIG. 4 is a flowchart of a video processing method for determining the lines in a video image, in accordance with the principles of the present invention.

The sequences that are defined as being stable shots can be further distinguished by recognizing, for the current example of a football game, a yard line detection algorithm which is used to determine if yard lines are within a video frame. This detection algorithm however will not detect the actual yard line that a ball can be on. If yard lines are present in a stable shot, it can be assumed that this video sequence can be the start of a down as there should not be any type of camera movement during such that time. FIG. 4 is a method for determining whether yard lines exist in a video sequence defined as being a stable shot.

Method 400 begins with an edge detection operation, in step 405, which is performed on an image selected from a sequence of frames which is identified as being a stable shot. In an exemplary embodiment of the invention, a canny edge detection technique as explained in the article, Canny, J., *A Computational Approach to Edge Detection*, IEEE Transactions Pattern Analysis and Machine Intelligence, Vol. 8, pg. 679-714, 1986, can be used to detect various edges of objects in the analyzed image. It is expected however that other edge detection methods can be used, in accordance with the principles of the present invention. The result of step 405 is a processed image.

In step 410, a dilation filter analysis is performed on processed image, where the dilation filter operates as a morphologic filter. Typically, a dilation operation on a graphic image will expand the size of objects in an image while the boundaries of such objects should be smoothed out. Dilation filtering is known in the art. This method applies the dilation filter operation on the filtered image at least A times, where A is an integer number greater than 0. The outcome of step 410 produces a filtered image.

In step 415, the filtered image from step 410 will have an erosion filter applied to it. An erosion filter operates in a manner opposite to that of the dilation filter, in that an image and the objects in an image are made smaller. Step 415 will be repeated B amount of times, where B is an integer value larger than A. The filtered image from step 415, will have a dilation filter applied on it, and such an operation will be repeated B-A times in step 420.

In step 425, a comparison is made between the filtered image from step 420 and the processed image from 405, where the result of such a comparison (for example, by performing an difference operation between the pixels of one image from a second image by use of a two input exclusive OR operator XOR, see Bovik, A. et al., Handbook of Image and Video Processing, Academic Press, pg. 33, 2005) the result of such a comparison will be the various boundaries of the objects in the image, as to create a resulting image. In step 430, a Hough transformation is performed on the resulting image, where the result of such a transformation will produce a series of lines. A standard Hough transformation is described in the article Duda, R. O. and P. E. Hart, *Use of Hough Transformation to Detect Lines and Curves in Pictures*, Communications of ACM, Vol 15, pgs. 11-15 (January, 1972), although other Hough transformations can be used.

Step 430 operates by excluding lines that exist at the top and the bottom of the image after the Hough transformation is applied. An additional test, in step 435, can be performed to see if a certain number of lines are present on the screen, which are spaced evenly and are parallel to each other. Such approaches of image analysis can be performed in accordance image techniques known in the art. If the result of step 435 determines that there a series of lines that are evenly spaced, it can be further assumed that the image is of a football field, and the stable shot represents the start of a down.

Referring back to FIG. 2, the resulting candidate video segments that are identified as being downs can be further analyzed by considering the text (from the closed captioning) that would be included in such segments. Once again, a keyword analysis, as described above, can be performed to determine if relevant keywords are in such closed captioning data. If such keywords are present, the apparatus 100 will identify the beginning of the stable shot as a start of a down, and note the subsequent standing shots (which meet the same criteria) as subsequent downs.

The result of this analysis can be shown in FIG. 2 when considering the metadata shown for time line 220. That is, the respective metadata from the closed captioning which would be of interest, are shown at 245, 255, 265 and 267. That is, one expects that the start of a down will have a textual description which describes the down, as well. The inclusion of metadata from 267 includes metadata concerning a touchdown that was scored during the third down. This "touchdown" keyword would also make the video segment corresponding to the third down, a video segment of interest.

The text extraction feature can also be on the look out for statistical information of the football game, as shown in 270, where such information can be transmitted at anytime. That is, unlike information describing a particular down, it is not expected that statistical information will be transmitted in a fashion that matches up to the start of a down, but the transmission of statistical information during a video segment could still mean that the video segment is one of interest, and is not a commercial. Segments 289 represent times at which metadata can be extracted, but such metadata is not relevant.

Once such segments are identified, as in accordance with the approaches noted in FIGS. 2-4, apparatus 100 can delete all of the segments not identified as downs from a saved version of the video media service, where the resulting media service would be shorter in time length than the original media service. Optionally, the apparatus can also index the respective segments identified as downs, with the metadata extracted from the closed captioning stream.

It is to be appreciated that the principles of the present invention do not only apply to the processing of American Football games, but the approaches of including both visual and textual processing techniques together can be utilize to produce digest version of other video media services, as well. For example, similar approaches to what is described for the present invention can be used for determining the innings in a baseball game, or when a news anchor is present in a newscast, where the other segments of the news cast can be eliminated from the newscast, if one were to consider all of the shots with the newscaster as being a stable shot.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

The teachings of the present principles can be implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit. It is also to be understood as shown in FIG. 1 that the principles of the present invention can be implemented in hardware in a video apparatus.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications can be effected therein by one of ordinary skill in the pertinent art without departing from the scope or spirit of the present principles. All such changes and modifications are intended to be included within the scope of the present principles as set forth in the appended claims.

The invention claimed is:

1. A method for classifying segments in a video media service comprising the steps of:
performing an image analysis process on the video media service as to develop at least two video segments from said video media service;
performing a text extraction process on metadata associated with the resulting at least two video segments to identify keywords in said metadata;
automatically identifying video segments of interest from said text extraction process and said image analysis process; and
automatically creating a digest version of a video media service by automatically deleting a video segment selected from said at least two video segments based on said identifying step that do not match at least one keyword criteria and at least one image shot criteria.

2. The method of claim 1 where the video segments of interest are stored as to form a new video media service.

3. The method of claim 1 where a segment from said at least two video segments is identified as either being a transition shot or a standing shot.

4. The method of claim 3, where the identification step is performed by using a color histogram analysis on the frames from the segment from said at least two video segments.

5. The method of claim 4, wherein a Hough transformation is performed on said identified segment as to determine whether lines exist in the video segment.

6. The method of claim 1 comprising an additional step of ranking said at least two segments based on the keywords associated with each segment.

7. The method of claim 1 where said at least one keyword criteria is "down" and said at least one image shot criteria is a standing shot.

* * * * *